UNITED STATES PATENT OFFICE.

ARMAND MÜLLER JACOBS, OF MOSCOW, RUSSIA, ASSIGNOR TO ABRAHAM GARRISON BURTNETT, OF BRONXVILLE, NEW YORK.

PROCESS OF MANUFACTURING OLEAGINOUS MORDANTS.

SPECIFICATION forming part of Letters Patent No. 245,633, dated August 16, 1881.

Application filed May 12, 1881. (No specimens.)

*To all whom it may concern:*

Be it known that I, ARMAND MÜLLER JACOBS, of Moscow, Russia, have invented a new and Improved Process for Manufacturing Oleaginous Sulpholimate and Oxyolimate Alkalies for use as Mordants in Turkey-Red Dyeing, of which the following is a specification.

The object of my invention is to provide a new and improved mordant for turkey-red dyeing and calico-printing, to be used in place of the castor-oil mordant in use at present.

I have discovered by repeated experiments that the operation and activity of the castor-oil mordant depends upon and is due to its properties of being a soluble oxyoleic acid and to its percentage of unchanged castor-oil, which is held in solution by the oleic acid, and is thus distributed on the fiber in the most minute particles, and thus gives the alizarine ammoniacal cochineal brightness (luster) and permanence.

By treating any desired oil with sulphuric acid in a manner that will be fully described hereinafter a certain mixture is obtained of sulpholeic acid with unchanged oil, the latter being in solution with the former, and which oil is converted or transformed into oxyoleic acid and a solid fatty acid (probably stearic acid) on the fiber treated with it, or by boiling it with water, accordingly as the sulpholeic acid is used before or after having been boiled with water, as will be more fully described hereinafter.

The following formula will illustrate the process:

A.

$2C_{18}H_{34}SO_5 + 3H_2O$ (sulpholeic acid and water) $= C_{18}H_{34} + O_3$ (ricinoleic acid) $+ C_{18}H_{36}O_2$ (probably stearic acid) $+ 2H_2SO_4$, (sulphuric acid.)

The unchanged oil (trioleate of glycerine) remains in solution in the fatty acid, and only separates upon addition of large quantities of alcohol. In the aqueous ammoniacal solution of these fatty acids the oil remains unchanged and does not separate. If the mixture of sulpholeic acid (neutralized by alkalies) and oil is used as a mordant in the same manner as the castor-oil mordant, a minute layer of fatty acid will be formed on the fiber, and the beauty of the color is impaired; but if the sulpholeic acid is boiled with water to separate the solid fatty acids, it forms a mordant in which the unchanged oil and the ricinoleic acid are in the most advantageous proportions, and the mordant surpasses the castor-oil mordant by far.

If oleic acid is used in place of the oil, sulpholeic acid only will be produced, and a quantity of oil must be added to make it operative as a mordant.

In carrying out my invention the oils, which may be of any desired kind, are cooled to 8° Reaumur, (46.5 Fahrenheit,) and are mixed with from twenty-five to thirty per cent. of cooled sulphuric acid of a specific gravity of 1.8195 to 1.8260, the mixture being stirred continually. The temperature of the mixture rises gradually as the acid is being added. As soon as the temperature has reached 39° to 40° Reaumur, (10.4 Fahrenheit,) which is indicated by an electric thermometer, the addition of acid is interrupted, and to the mixture is added double its quantity of cold water, the temperature of the mixture being kept as low as 10° Reaumur (50° Fahrenheit) by means of a cooling-worm, through which cold water flows, and which worm is arranged in the vessel containing the mixture, or by means of some other suitable cooling device. This cooling prevents a decomposition of the sulpholeic acid, which would take place with an emission of sulphurous acid in case the temperature is higher than given above. The viscous or thick white mixture is placed into a settling-vessel, in which it remains for about two days, during which time sulpholeic acid, which contains about fifteen per cent. of unchanged oil, separates from the watery fluid containing sulphuric acid. The reaction product (A) has a specific gravity of 0.990 to 1.025, accordingly as the same contains a greater or less quantity of unchanged oil. Its properties of solubility in water, alcohol, alkalies, and its separability from the unchanged oil vary correspondingly with the higher or lower specific gravity. If the specific gravity is high, which is attained by a thorough cooling, the small quantity of oil will remain in complete solution, and the product will act and operate so much better. This product can be neutralized by means of alkalies, and can be used in turkey-red dyeing and calico-printing in place of the castor-oil mordant in case the beauty of the color obtained is a matter of no great importance. Otherwise this mass is boiled in from three to six times its quantity of distilled water until the fatty acids and the sulphuric acids are completely separated and the former float as a clear substance on the surface of the water. The watery fluid is poured off, and the fatty acids are again repeatedly boiled with fresh water, and finally the mixture of fatty acids, which are insoluble in water, is permitted to cool and congeal. The same is then placed into a cold place for three days, to permit the solid fatty acids to crystallize or separate, and after this separation the solid and fluid parts are separated by means of a filter-press.

The fluid part, which consists, mainly, of ricinoleic acid ($C_{18}H_{34}O_3$) and a small quantity of unchanged oil, is boiled with its quantity or more of cold water, and with as much potash or soda-lye or spirits of sal-ammoniac as is required to produce perfect saponification or a slight alkaline reaction. After being properly diluted, it is used in this form as turkey-red oil to mordant the cotton. The solid part, which consists, mainly, of Fremy's hydromargaritic acid, (probably stearic acid,) which melts at 69.5° centigrade, (157° Fahrenheit,) and of a small quantity of unchanged oil, is converted into potash, soda, or ammonia soap, and is used to brighten (vivify) the dyed goods as a substitute for the castile-soap which has been used for the purpose heretofore.

In place of the oils, oleic acid can be used, which is treated with sulphuric acid in the manner described above; but ten per cent. of some kind of oil is added to the mixture of fatty acids (containing sulphuric acids) after the same has been completely separated from the watery fluid, which oil will be dissolved in the mixture of fatty acids in about two to three hours if the mixture is properly stirred. The mixture is then boiled with water and crystallized, pressed, and treated as above described.

Having thus fully described my invention, I claim as new and desire to secure by Letters Patent—

The process herein described of producing an oxyoleic alkali to be used as a mordant in turkey-red dyeing, consisting in treating all kinds of vegetable and animal oils, fats, or oleic acid with sulphuric acid, then adding double the quantity of cold water, whereby sulpholeic acid is formed, which is permitted to settle and separate from the aqueous liquid upon which this sulpholeic acid is boiled with from three to six times its quantity of distilled water until the fatty acids and the sulphuric acid have been completely separated and the former float on the watery fluid, which is then poured off, upon which the fatty acid (now mainly ricinoleic acid) is repeatedly boiled with fresh water, is then separated from the solid parts, and is mixed with cold water and enough alkali to neutralize or produce a slight alkaline reaction, substantially as described.

ARMAND MÜLLER JACOBS.

Witnesses:
   JEAN FISCHER,
   ALEXANDER LICHODEJEFFSICI.